Feb. 2, 1965   H. E. G. ARNESON   3,167,868
DEVICE FOR PREDETERMINING BORING TOOL DIAMETER
Filed March 20, 1962   3 Sheets-Sheet 2

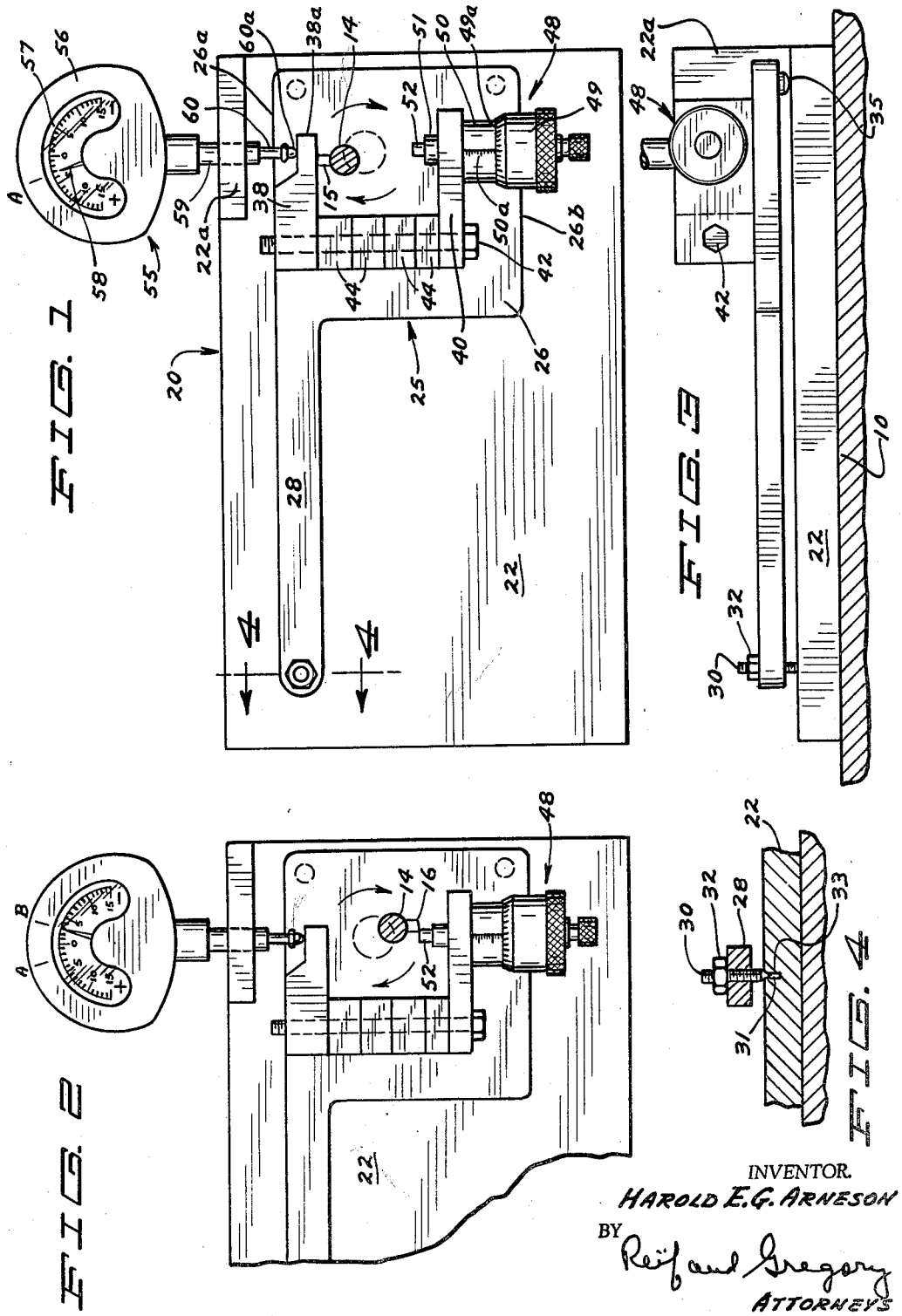

INVENTOR.
HAROLD E. G. ARNESON
BY Richard Gregory
ATTORNEYS

Feb. 2, 1965    H. E. G. ARNESON    3,167,868
DEVICE FOR PREDETERMINING BORING TOOL DIAMETER
Filed March 20, 1962    3 Sheets-Sheet 3

INVENTOR.
HAROLD E. G. ARNESON
BY
ATTORNEYS

United States Patent Office 3,167,868
Patented Feb. 2, 1965

3,167,868
DEVICE FOR PREDETERMINING BORING TOOL DIAMETER
Harold E. G. Arneson, % Professional Instruments Co., 6824 W. Lake St., Minneapolis, Minn.
Filed Mar. 20, 1962, Ser. No. 181,037
1 Claim. (Cl. 33—185)

This improvement relates to improvement in a device for presetting boring tools to exact boring diameters. The applicant provides a very simply constructed and simply operated device which measures the cutting diameter of the boring tool in operative motion. The term boring tool is herein used with reference to a boring machine or boring device generally.

Applicant's device measures the diameter of the circle described by the cutting point of the boring tool. It is a common practice to measure the radius of the cutting point of the boring tool relative to the axis of its spindle or relative to the axis of its shank or body portion. The applicant's device determines a cutting diameter independent of the degree of exactness with which the boring tool may be mounted in its machine spindle and independent of any inaccuracy which may result from the degree of deviation of the axis of the body of the boring tool relative to the axis of rotation of said boring tool. Thus there is substantial improvement present in the applicant's device.

It is an object of this invention therefore to provide a device to preset a boring tool to a predetermined boring diameter by presetting the cutting diameter of said boring tool in its operating position and in operative motion.

It is another object of this invention to provide a device which measures the diameter of the circle described by the cutting tip of the boring tool relative to the axis of rotation of said boring tool.

It is a further object of this invention to provide a device to predetermine the cutting diameter of a boring tool independent of any reference to the axis of the body of said boring tool.

It is a more specific object of this invention to provide a device to be removably mounted on a boring machine with relation to its boring tool in operating position to preset the cutting diameter of said boring tool by a measure of the diameter of the circle described by said boring tool in operative motion and mounted in operating position.

These and other objects and advantages of the invention will be fully set forth in the following description made in connection with the accompanying drawings in which like reference characters refer to similar parts throughout the several views and in which:

FIG. 1 is a plan view of applicant's device with some portions thereof shown in dotted line;

FIG. 2 is a broken plan view similar to the view shown in FIG. 1, with some portions thereof in a different operating position;

FIG. 3 is a view of applicant's device in side elevation with some portions thereof being broken away;

FIG. 4 is a broken view in vertical section taken on line 4—4 of FIG. 1, as indicated by the arrows;

Figure 5:
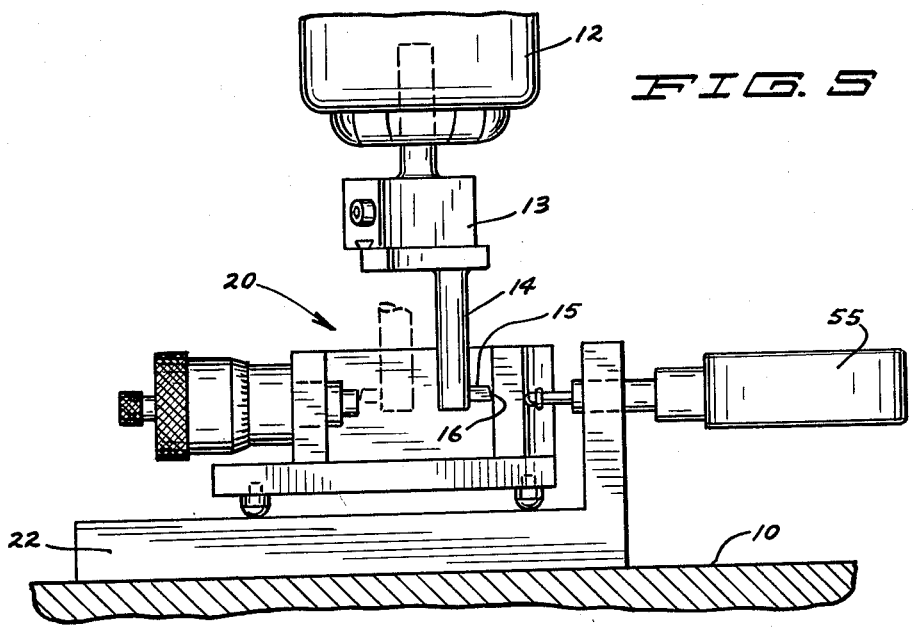
FIG. 5 is a view of applicant's device in end elevation, with some portions thereof being broken away and a portion in a different position shown in dotted line.

Referring to the drawings, and more particularly to FIGS. 1-5, a preferred embodiment of the applicant's device is shown. Reference is had to a vertical boring machine of which there is indicated a machine table 10 and in relation therewith in broken view, a spindle 12 and a boring head 13 having adjustably mounted therein a boring bar 14 carrying a cutting tool 15 having a cutting tip 16. Only as much of the machine tool is shown as is deemed necessary to show the functional relationship therewith of applicant's device.

In operating position on said machine table 10 is applicant's device 20 comprising a base plate member 22 shown here to be rectangular in plan. Said plate member will be of sufficient weight to hold a steady position during the operation of applicant's device in presetting the boring tool.

Movably mounted on said base plate member 22, and here shown to be pivotally mounted, is a plate member 25 comprising a substantially rectangular head portion 26 and an elongated leg portion 28 rectangular in cross section forming a rearward extension of one side of said plate portion 26. A threaded pin 30 is vertically disposed through said leg portion 28 adjacent its free end, with said pin being secured by a lock nut 32 and having a lower end portion 31 of reduced diameter pivotally seated in a recess 33 of said base plate portion 22. Said head portion 26 is supported adjacent its leading edge portion by a pair of transversely spaced spherical jig feet 35 which will be secured in a known manner, as by being pressed into said plate 26.

Said head portion 26 comprises side portions 26a and 26b. Upstanding from said side portion 26a is a wall 38 having a forward end portion 38a of reduced width forming an anvil. Carried on said plate member 26 is a second wall 40 which is secured in a parallel spaced operating relationship to the wall 38 by a bolt 42 transversely disposed through one end portion of the wall 40 and threaded into the wall portion 38. Disposed between said wall portions 38 and 40 and carried on said bolt 42 are apertured spacing or gauge blocks 44 which will vary in width and number depending on the spacing desired between said wall portions. With said gauge blocks in position and said bolt tightened, said wall portions 38 and 40 will be parallel to one another.

Carried horizontally in said wall 40 is a micrometer head 48 comprising a thimble 49, a barrel 50 having a reduced portion 51 of said barrel secured to said wall 40 by being press fitted thereinto, and movable through said reduced barrel portion is the spindle 52 which in effect at its end or seating surface forms an anvil in opposed parallel relation to said anvil 38a. Said barrel and thimble respectively will have customary indicia 49a and 50a thereon.

Upstanding from said base plate 22 adjacent said side portion 26a is a wall portion 22a, and carried by said wall portion is one form of an indicator shown here as a dial indicator or gauge 55 comprising a head portion having a dial 57 and pointer 58 in connection therewith, and having a barrel portion 59 press fitted into said wall 22a. Disposed through said barrel is a spindle 60 having its end surface 60a in operative engagement with said wall portion 38a.

*Operation*

The base member 22 will be positioned on the table of a boring machine and the anvils 38a and 52 will be positioned in diametric relation relative to the circle described by the cutting point 16 of the boring bar 15. Said anvils will be so positioned as to be engaged by said cutting tip.

A predetermined space will be established between the anvils which is effected by placing gauge blocks 44 therebetween mounted on the bolt 42 and by adjustment of anvil 52 by the micrometer head 48. The spacing thus established will be just short of a required or desired cutting diameter whereby said anvils will be alternately diametrically displaced a measurable distance by engagement with the cutting tip of the boring bar as it moves in rotation from one anvil to the other.

The displacement is measured by the dial indicator 55. Said pivotal plate 25 in being positioned relative to the cutting point of the boring bar will also be positioned, relative to the dial indicator, preferably to have a zero reading of said dial indicator. The friction of the pivotal member 25 will be sufficient to withstand the force exerted by the spindle of the dial indicator.

Hence in its rotation, the cutting tip 16 of the boring bar 15 will move the anvils 38a and 52 towards and away from said dial indicator, as indicated in FIGS. 1 and 2. Thus a reading will be established to indicate displacement in each direction. With reference to FIG. 2, the total displacement or the total indicator reading is the distance indicated between the reference characters A and B. The actual cutting diameter therefore will be the total indicator reading added to the distance between the anvils. Thus assuming the distance between the anvils is 1.999 inches and, referring to FIG. 2, with the reading at point A at +.00030 inch, and the reading at point B at −.00025 inch, the effective cutting diameter will be 1.999 inches plus the total indicator reading of .00055 inch or 2.00045 inches.

The boring tool will then be adjusted until the measured displacement of the anvils 52 and 38a indicates the exact required cutting diameter. Thus the diameter of the circle swept by the cutting tip of the boring bar is measured by the operative motion of said cutting tip in operating position and this measurement is independent of any reference to the axis of the body of the boring bar.

*Modification*

Figure 8:
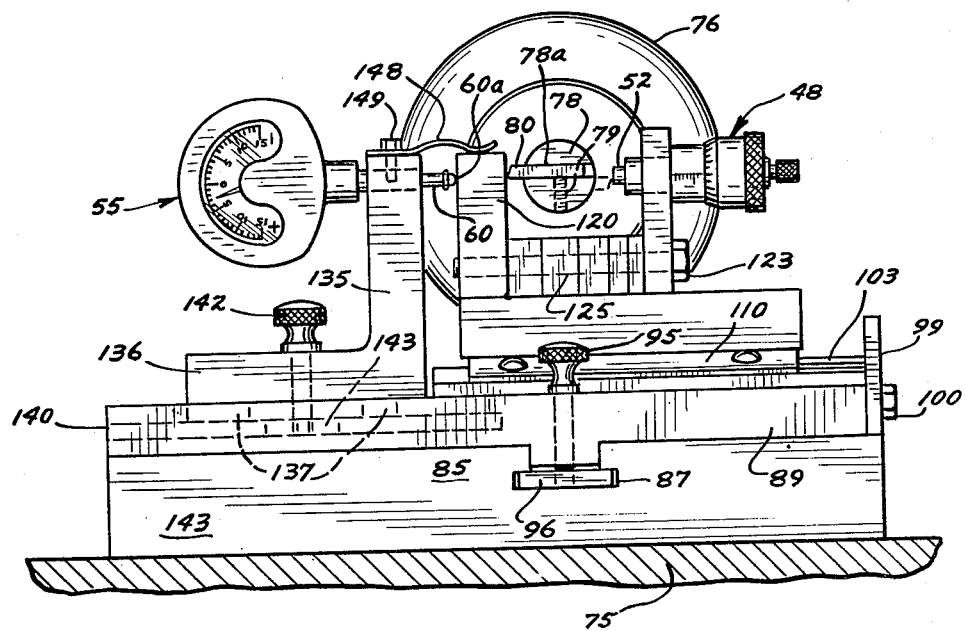
FIG. 8 is a view of applicant's modified device in end elevation showing some portions in dotted line.
Figure 6:
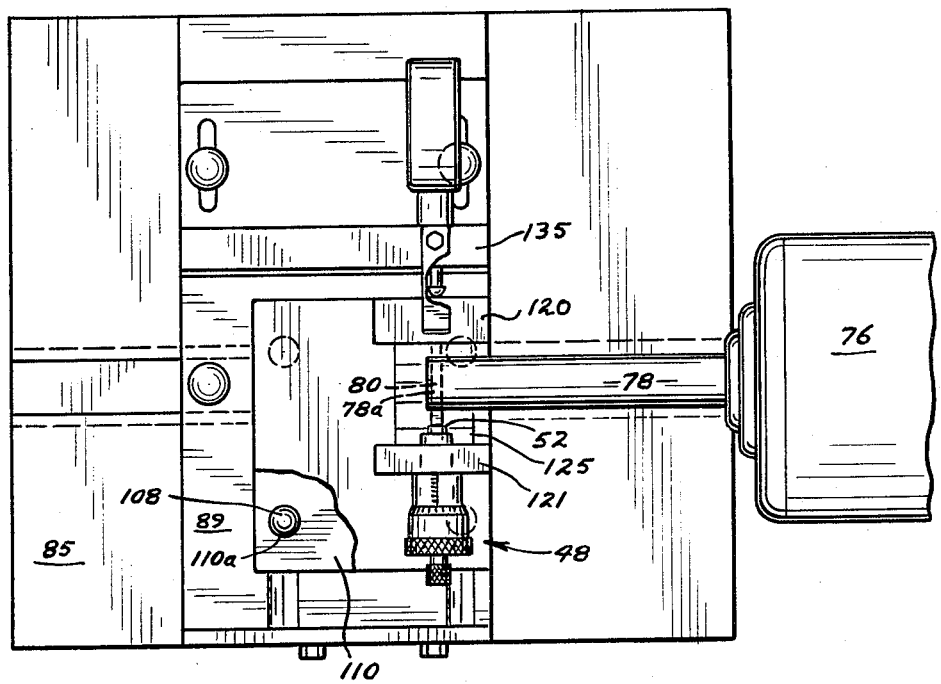
FIG. 6 is a plan view of a modification of applicant's device, with some portions thereof being indicated in dotted line and some portions broken away.
Figure 7:
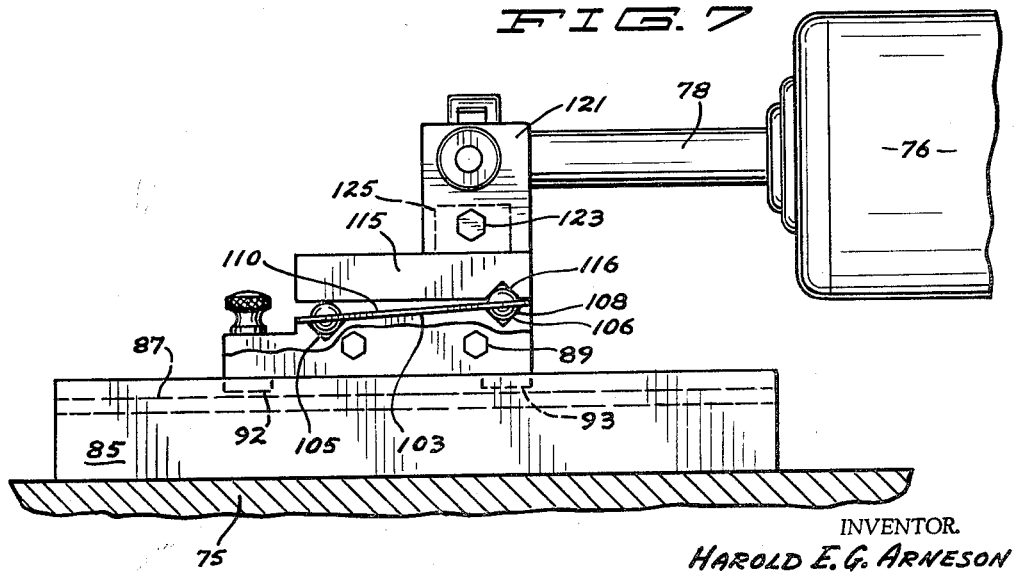
FIG. 7 is a view of applicant's modified device in side elevation, with some portions being shown in dotted line and some portions being broken away.

With reference to FIGS. 6–8, a modification of applicant's device is shown wherein it is modified to be used in connection with a horizontal boring machine as compared to the structure shown in FIGS. 1–5 which was adapted for use in connection with a vertical boring machine. Both structures of the invention shown embody the use of the same principles of operation and the same steps of operation. Identical portions will be indicated by like reference characters.

The machine table 75 of a horizontal boring machine is indicated, and in association therewith are a machine spindle 76, a boring bar 78, and a cutting tool 80 shown adjustably disposed in slot 78a and secured by a set screw 79.

A base plate 85 substantially rectangular in plan is shown in operating position on the machine table 75 and may be secured thereon in various known ways. Running longitudinally through said base plate 85, that is in the direction toward and away from the spindle 76, and somewhat to the right of its center, as indicated in FIG. 8, is a T slot 87. Said base plate 85 will be positioned to have said T slot parallel to the axis of the boring bar 78. A plate member 89 rectangular in plan forming a carriage is carried on said base plate 85 extending transversely thereacross having a pair of depending longitudinally spaced keys or guides 82 and 93 disposed in the upper portion of said T slot for guided longitudinal movement of said carriage 89 relative to said base plate 85. Said carriage 89 is shown having a width the same as that of said base member 85. Said key 93 has a knurl headed locking screw 95 disposed vertically therethrough and threaded into a T nut 96 as a locking means for securing the position of said carriage 89.

Upstanding from the outer side of said carriage 89 is a plate member 99 secured thereto by bolts 100 forming a stop plate for a purpose to be hereinafter indicated.

Said carriage 89 has a stepped up upwardly inclined portion 103 spaced inwardly somewhat from the screw 95 and extending to the leading edge portion thereof and having a width somewhat more than one-half of the width of said carriage. Formed in the face of said inclined portion are a pair of longitudinally spaced transverse V slots 105 and 106. Disposed in said slots are balls or bearings 108 here shown to be four in number. A plate member 110 forming a bearing cage overlies a substantial portion of said stepped up portion 103 having spaced apertures 110a disposed over the balls therein, with a pair of balls being transversely spaced in each slot. Said apertures in combination with said V grooves will be designed to hold said balls for free rotation.

Overlying said stepped portion 103 and more specifically said cage 110 is a rectangular plate member 115 forming an upper carriage. Said upper carriage will be supported by said balls 108. More particularly a transverse V groove 116 is formed in alignment with the groove 106 whereby the balls in said groove 106 will seat in the groove 116. The groove 116 will have a depth to compensate for the degree of inclination of said stepped portion 103 whereby said upper carriage is disposed in a horizontal plane in having its rearward portion supported directly by the balls in the groove 105. Thus the upper carriage 115 is very nicely held in position with its groove 116 forming a guide for its free transverse movement. Both the cage 110 and said balls 108 will move transversely with said upper carriage 115. The movement of said upper carriage will be limited in one direction by the stop plate 99.

Upstanding from the forward inner side portion of said carriage 115 and integral therewith is an anvil 120 in the form of a wall. A second wall portion 121 is provided held in spaced parallel relation to said anvil 120 by a bolt 123 disposed through said wall portion 121 and threaded into said anvil. Spacing said anvil and said wall portions 121 apart any certain desired distance are spacing means 125 here shown in the form of gauge or spacing blocks.

Mounted on said wall 121 in the same manner as on said wall 40 is a micrometer 48 having the end surface of its spindle 52 forming a longitudinally adjustable second anvil. Said anvils 120 and 52 will have parallel facing surfaces.

In spaced parallel relation to said wall or anvil 120 is a wall portion 135 having a right-angled base portion 136 having depending key portions 137 disposed in the upper groove portion of a transverse T slot 140 formed in the plate member 89. A knurl headed set screw 142 is disposed through said base portion 136 to be threaded into a T nut 143 disposed in the T portion of said slot.

Carried in connection with said wall 135 is an indicating means here shown very simply in the form of a dial indicator 55 having the spherical end surface 60a of its spindle 60 in pressing engagement with the adjacent surface of the anvil 120. Said spindles 60 and 52 preferably will be in axial alignment.

To offset the force of the dial spindle 60, a plate spring 148 is secured by a bolt 149 to the upper end portion of the wall portion 135. Said plate spring extends transversely to extend over and frictionally engage the upper surface of the wall or anvil 120.

The operation of the modified structure above described is the same as in connection with the operation of the structure first above described. The positioning of the parts of the device preliminary to presetting the cutting bar is obvious from a description of the various parts in view of the operation above described.

It will of course be understood that various changes may be made in the form, details, arrangement and proportions of the device and in the steps and sequence of steps of the method without departing from the scope of applicant's invention which, generally stated, consists in a method and device capable of carrying out the objects above set forth, such as disclosed and defined in the appended claim.

What is claimed is:

A device for presetting the diameter of a boring tool mounted on a spindle in connection with a boring machine having in combination, a base plate member disposed on the table of said machine, an elongated table member mounted on said base plate member, a pair of opposed anvil portions supported on one end portion of said elongated table member, means movably supporting said elongated table member on said base plate at said one end portion thereof, and means pivotally supporting said elongated table member on said base plate member at a point thereof remote from said one end portion, means spacing said anvil portion in measured spaced relation and said anvil portions being aligned axially of said boring tool to be respectively alternately engaged by the cutting point of said boring tool, measuring means carried by said base plate relative to said end portion of said elongated table member to indicate the extent of the movement thereof resulting from the displacement of said respective anvil portions by engagement thereof by said cutting point, said one end portion of said elongated table member being substantially rectangular in plan, a leg portion forming a coplanar extension of one side of said one end portion, said pivotal means being at the free end of said leg portion, an upstanding wall at one side of said one end portion in longitudinal alignment with said extended leg portion forming stationarily one of said anvil portions at its inner side, said spacing means comprising premeasured spacing members movably spacing the other of said anvil portions from said stationary anvil portion, means holding said anvil portions and said spacing members rigid with said elongated table member, and said measuring means being in engagement with said upstanding wall and in alignment with said anvil portion thereof to measure the movement of said wall in the direction towards and away therefrom whereby said extent of movement is an increment added to the measured space between said anvil portions to determine the actual cutting diameter of said boring tool.

References Cited by the Examiner

UNITED STATES PATENTS

| 2,156,500 | 5/39 | Jeschor | 33—185 |
| 2,348,530 | 5/44 | Droitcour et al. | 33—185 |
| 2,665,491 | 1/54 | Henslee | 33—165 X |

FOREIGN PATENTS

| 844,067 | 7/52 | Germany. |
| 604,315 | 7/48 | Great Britain. |

ISAAC LISANN, *Primary Examiner.*